United States Patent
Ohnishi et al.

(10) Patent No.: US 7,250,698 B2
(45) Date of Patent: Jul. 31, 2007

(54) MULTI-PHASE CLAW-POLE TYPE ROTARY MACHINE

(75) Inventors: Kazuo Ohnishi, Gunma (JP); Shoji Ohiwa, Gunma (JP); Yasuaki Motegi, Gunma (JP); Yuji Enomoto, Ibaraki (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 11/260,535

(22) Filed: Oct. 27, 2005

(65) Prior Publication Data
US 2006/0091760 A1 May 4, 2006

(30) Foreign Application Priority Data
Nov. 2, 2004 (JP) .............. 2004/318836

(51) Int. Cl.
*H02K 37/14* (2006.01)
(52) U.S. Cl. ............. 310/49 R; 310/257
(58) Field of Classification Search ......... 310/49 R, 310/257, 263, 156.01
See application file for complete search history.

(56) References Cited

U.S. PATENT DOCUMENTS 6,259,176 B1 * 7/2001 Isozaki et al. ........... 310/49 R
6,479,911 B1 * 11/2002 Koike et al. ........... 310/49 R

FOREIGN PATENT DOCUMENTS

| JP | B1 10136631 | 5/1998 |
|---|---|---|
| JP | B2 2001161055 | 6/2001 |

* cited by examiner

*Primary Examiner*—Darren Schuberg
*Assistant Examiner*—Nguyen N. Hanh
(74) *Attorney, Agent, or Firm*—Boyle Fredrickson Newholm Stein & Gratz S.C.

(57) ABSTRACT

A two-phase or three-phase claw-pole type rotary machine comprises two or three coaxially arranged single phase rotary machine elements. Each of the rotary machine elements has a magnet rotor, a claw-pole type stator, and an annular stator winding. Claw poles of the stator are divided into a plurality of blocks and are circumferentially separated from one another. A distance between adjacent claw poles of the same polarity in each block is $(\beta_0-\Delta\beta)$, substantially, where $\beta_0$ is a reference pitch when the claw poles of the same polarity are arranged equidistantly apart from one another in a range of 360°, $\Delta\beta$ is $\pi/2q$, or $\pi/3q$ and q is a number of claw poles of the same polarity in each block. The first and second rotary machine elements are circumferentially shifted from each other by 90° or 120°.

12 Claims, 5 Drawing Sheets

MAGNETIC POLE NUMBER :$2p$
AIR GAP CENTER RADIUS :$r$

US 7,250,698 B2

MULTI-PHASE CLAW-POLE TYPE ROTARY MACHINE

BACKGROUND OF THE INVENTION

1. Field of the Invention

The present invention relates to a multi-phase claw-pole type rotary machine and, more particularly, relates to a two-phase or three-phase permanent magnet (PM) type stepping motor reduced in cogging torque.

2. Description of the Prior Art

FIG. 1A and FIG. 1B show a two-phase PM type stepping motor comprising first and second rotary machine elements each for single phase arranged coaxially with each other. Each of the first and second rotary machine elements comprises an inner magnet rotor magnetized in a circumferential direction thereof so as to form N pole and S pole alternately, a claw-pole type outer stator arranged concentrically with the inner magnet rotor with an air gap therebetween, and an annular stator winding. The claw poles of the stator are formed on one side and the other side of the stator as shown in FIG. 1B. The claw-poles of each side are the same in number with magnetic poles of the rotor, and a magnetic flux entered into the claw pole of one side is returned to the claw pole of the other side passing through the annular winding. In case of a two-phase motor, two single-phase motors are connected coaxially with a phase difference of 90° (electric angle). In case of a three-phase motor, three single-phase motors are connected coaxially with a phase difference of 120° (electric angle).

In the conventional claw-pole type motor, the pitch of the claw poles of the stator is equal to the pitch of the magnetic poles of the rotor, so that the cogging torque becomes large.

A PM type stepping motor reduced in cogging torque by varying the pitch of the claw poles of the stator is disclosed in the Japanese Patent Application Laid-Open No. 136631/1998 and the Japanese Patent Application Laid-Open No. 161055/2001.

However, in such conventional stepping motor, the magnetic attraction force becomes unbalanced because the interval of the claw poles is varied so as to form a too narrow portion unreasonably or the position of the claw poles becomes asymmetric with respect to the shaft, so that a large vibration and noise are produced.

SUMMARY OF THE INVENTION

An object of the present invention is to provide a multi-phase claw-pole type rotary machine free from the above drawbacks.

A further object of the present invention is to provide a two-phase claw-pole type rotary machine comprising first and second rotary machine elements each for single phase arranged coaxially with each other, each of the rotary machine elements having a magnet rotor magnetized in a circumferential direction thereof so as to form N pole and S pole alternately, a claw-pole type stator arranged concentrically with the magnet rotor with an air gap therebetween, and an annular stator winding, wherein claw poles of the stator are divided into a plurality of blocks, or two or four blocks, for example, and circumferentially separated from one another, a distance between adjacent claw poles of the same polarity in each block is set to a value ($\beta_0 - \Delta\beta$), substantially, where $\beta_0$ is a reference pitch when the claw poles of the same polarity are arranged with equidistantly apart from one another in a range of 360°, $\Delta\beta$ is $\pi/2q$ (electric angle), and q is a number of claw poles of the same polarity in each block, and wherein the first and second rotary machine elements are circumferentially shifted from each other by 90° (electric angle).

Still further object of the present invention is to provide a three-phase claw-pole type rotary machine comprising first, second and third rotary machine elements each for single phase arranged coaxially with one another, each of the rotary machine elements having a magnet rotor magnetized in a circumferential direction thereof so as to form N pole and S pole alternately, a claw-pole type stator arranged concentrically with the magnet rotor with an air gap therebetween, and an annular stator winding, wherein claw poles of each stator are divided into a plurality of blocks or two or four blocks, for example, and circumferentially separated from one another, a distance between adjacent claw poles of the same polarity in each block is set to a value of ($\beta_0 - \Delta\beta$), substantially, where $\beta_0$ is a reference pitch when the claw poles of the same polarity are arranged with equidistantly apart from one another in a range of 360°, $\Delta\beta$ is $\pi/3q$, and q is a number of claw poles of the same polarity in each block, and wherein the first, second and third rotary machine elements are circumferentially shifted from one another by 120° (electric angle).

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DESCRIPTION OF THE PREFERRED EMBODIMENTS

Figure 1A:
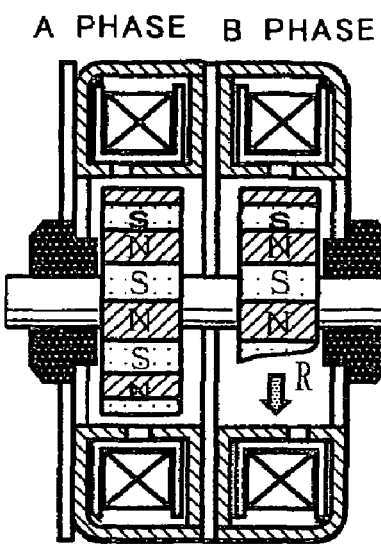
FIG. 1A is a vertically sectioned side view of a two-phase claw-pole type rotary machine according to the present invention.
Figure 1B:
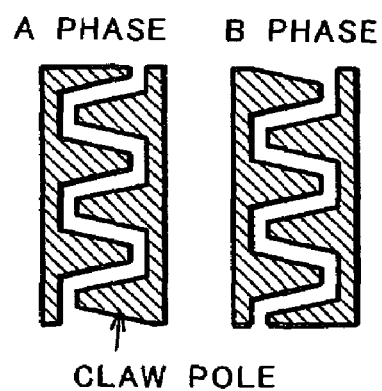
FIG. 1B is an extended view of claw-poles of the stator shown in FIG. 1A.
Figure 2:
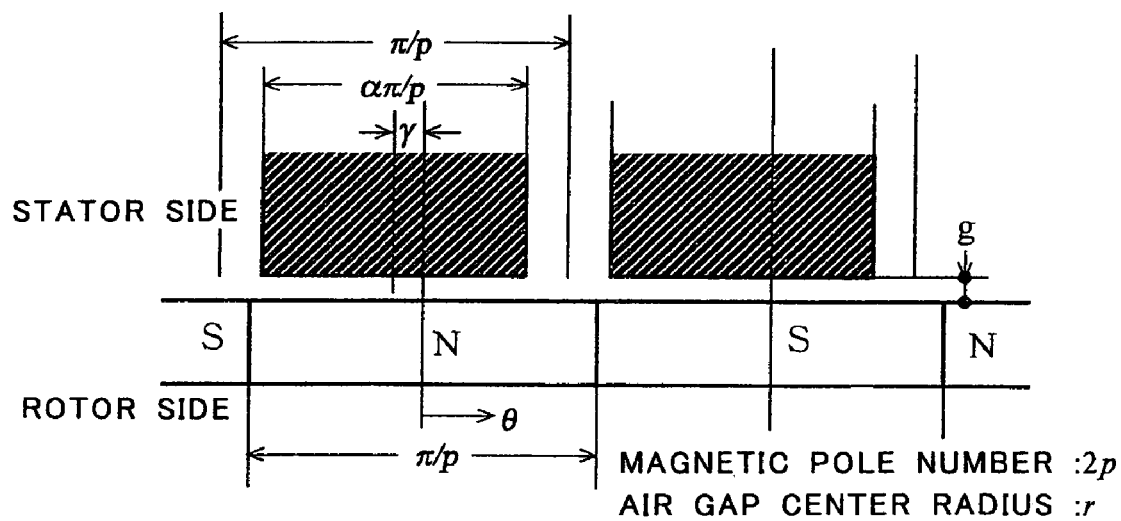
FIG. 2 is an extended view of the stator and the rotor shown in FIG. 1A for explaining the cogging torque.

As shown in FIG. 2, a pitch of the magnetic poles of the rotor shown in FIG. 1A is 2π/2p in mechanical angle, if the number of the magnetic poles is 2p. As shown in FIG. 1B, the stator magnetic pole is a trapezoid form. However, it is assumed simply that the form of the magnetic pole is a rectangular and the width is a times of the pitch of the magnetic poles, where α is an arbitrary value. In case that the width of the magnetic pole is varied gradually as a trapezoid form a mean value of α of the trapezoid form is used. FIG. 2 shows a state that the rotor is rotated in the rightward direction by an angle γ.

Figure 3:
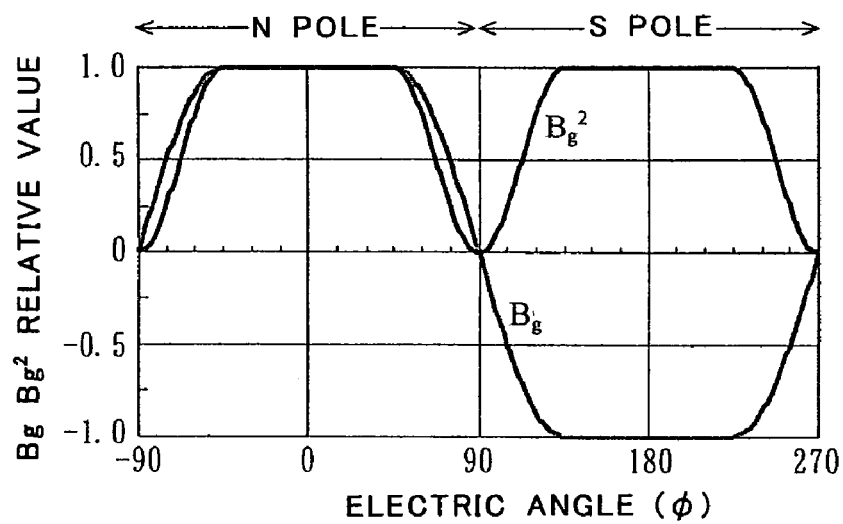
FIG. 3 is a view for explaining the distribution of the magnetic flux density in an air gap of the motor shown in FIG. 1A.

Further, it is assumed that the stator magnetic pole has no groove and flat, that the magnetic flux density $B_g$ in an air gap is a periodic function having a period corresponding to the magnetic pole pair as shown in FIG. 3, and that only a magnetic flux facing the stator magnetic pole απ/p shown in FIG. 2 is entered into the stator magnetic pole.

(The Relation Between the Magnetic Energy and the Cogging Torque)

The magnetic energy density $w_m$ at a small portion in the air gap can be expressed by Formula 1.

$$w_m = \frac{1}{2\mu_0} B_g^2 \tag{1}$$

Here, $\mu_0$ is a vacuum permeability. The form of the $B_g^2(\theta)$ is shown in FIG. 3 corresponding to the angular function $B_g(\theta)$ of the magnetic flux density in the air gap. In FIG. 3, φ is an electric angle and pθ. Specifically, $B_g^2(\theta)$ can be expressed by Formula 2 by using the Fourier series assuming that $B_g^2(\theta)$ is an even function having a fundamental period π/p with respect to θ, of which origin is a center of the magnet.

$$B_g^2(\theta) = B_0^2 + \sum_{n=1}^{\infty} B_n^2 \cos 2pn\theta \tag{2}$$

Here, 2p is a pole number, n is a degree of Fourier series and positive integer, and θ is an angle from the magnetic pole center. It is assumed further that the magnetic flux density is distributed similarly in the axial direction. The magnetic energy is stored mainly in the air gap, so that the total magnetic energy can be obtained by integrating the magnetic energy density $w_m$ shown in the Formula 1 through the entire air gap as expressed by Formula 3. It should be considered that only the magnetic flux under the stator magnetic pole shown in FIG. 2 is integrated.

$$w_m = \frac{Lg}{2\mu_0} \int_0^{2\pi} B_g^2(\theta) r\, d\theta = \frac{\pi r L g}{\mu_0} B_0^2 + \frac{rLg}{\mu_0} \sum_{n=1}^{\infty} \int_0^{2\pi} (B_n^2 \cos 2pn\theta)\, d\theta \tag{3}$$

Here, L is an effective thickness of iron core, and g is an air gap length.

The torque can be given by the differential coefficient with respect to the rotation angle γ of the magnetic energy density $w_m$, and the differentiation of the first term of the right side of the Formula 3 becomes zero and has no relation to the torque. Accordingly, only the second term of the right side of the Formula 3 is studied.

It is considered that the total magnetic energy can be obtained by summing the magnetic energies under the magnetic poles with windings. Accordingly, the term of the degree n about one magnetic pole can be expressed by Formula 4.

$$\begin{aligned} w_{m1n} &= \frac{rLg}{\mu_0} \int_{-\alpha\pi/2p-\gamma}^{\alpha\pi/2p-\gamma} (B_n^2 \cos 2pn(\theta))\, d\theta = -\frac{rLg}{\mu_0} \frac{B_n^2}{2pn} [\sin 2pn\theta]_{-\alpha\pi/2p-\gamma}^{\alpha\pi/2p-\gamma} \\ &= -\frac{rLg}{\mu_0} \frac{B_n^2}{2pn} [\sin(n\alpha\pi - 2np\gamma) - \sin(-n\alpha\pi - 2np\gamma)] \\ &= -\frac{rLg}{\mu_0} \frac{B_n^2}{pn} \sin n\alpha\pi \cos 2np\gamma \end{aligned} \tag{4}$$

On the other hand, the cogging torque is considered as the rate of change of the magnetic energy due to the magnet when the rotor is moved to an imaginary very small distance, so that the torque for one magnetic pole can be expressed by Formula 5.

$$T_{m1n} = \frac{\partial w_{m1n}}{\partial \gamma} = \frac{2rLgB_n^2}{\mu_0} \sin n\alpha\pi \sum_{k=1}^{2p} \sin 2np\gamma \tag{5}$$

A torque for one phase can be obtained by summing the torque for the magnetic poles of one phase. A torque for the N poles can be expressed by Formula 6.

$$T_{mANn} = \sum_N T_{m1n} = \frac{2rLgB_n^2}{\mu_0} \sin n\alpha\pi \sum_{k=1}^{p} \sin 2np(\gamma + \beta_k) \tag{6}$$

A torque for the S poles can be expressed by Formula 7.

$$T_{mASn} = \sum_S T_{m1n} = \frac{2rLgB_n^2}{\mu_0} \sin n\alpha\pi \sum_{k=1}^{p} \sin 2n(p(\gamma + \beta_k) + \pi + \varepsilon) \tag{7}$$

Here, $\beta_k$ is an angle of each magnetic pole, ε is a deviation (electric angle) of the magnetic pole of N pole side and the magnetic pole of S pole side from the normal change electric angle π. In order to simplify, if it is assumed that the common portion can be expressed by $T_{mANn}$, $T_{mANn}$ and $T_{mASn}$ can be expressed by Formula 8.

$$T_{mANn} = T_{mANn} \sin 2n\gamma_e \quad T_{mASn} = T_{mANn} \sin 2n(\gamma_e + \pi + \varepsilon) \tag{8}$$

Here, $\gamma_e$ is pγ (electric angle).

Further, it is considered that the torque of each phase is different in phase by 2π/m, where m is a number of phases and 4 in the two-phase motor. In the two-phase motor, the toque in B phase can be expressed by Formula 9.

$$T_{mBNn} = T_{mANn} \sin 2n(\gamma_e + \pi/2) \quad T_{mBSn} = T_{mANn} \sin 2n(\gamma_e + 3\pi/2 + \varepsilon) \tag{9}$$

The total torque can be obtained by summing a torque of the N pole side and a torque of S pole sides. Accordingly, the higher harmonic components of the two-phase motor cogging torque in each phase with respect to the low degrees n can be shown in a Table 1.

TABLE 1

| | degree n | | | |
|---|---|---|---|---|
| | 1 | 2 | 3 | 4 |
| A phase | $\sin 2(\gamma_e)$ | $\sin 4(\gamma_e)$ | $\sin 6(\gamma_e)$ | $\sin 8(\gamma_e)$ |
| $\overline{A}$ phase | $\sin 2(\gamma_e + \epsilon)$ | $\sin 4(\gamma_e + \epsilon)$ | $\sin 6(\gamma_e + \epsilon)$ | $\sin 8(\gamma_e + \epsilon)$ |
| B phase | $-\sin 2(\gamma_e)$ | $\sin 4(\gamma_e)$ | $-\sin 6(\gamma_e)$ | $\sin 8(\gamma_e)$ |
| $\overline{B}$ phase | $-\sin 2(\gamma_e + \epsilon)$ | $\sin 4(\gamma_e + \epsilon)$ | $-\sin 6(\gamma_e + \epsilon)$ | $\sin 8(\gamma_e + \epsilon)$ |
| $\Sigma$ | $=0$ | $\approx 4\sin 4(\gamma_e)$ | $=0$ | $\approx \sin 8(\gamma_e)$ |

In the TABLE 1, the coefficient $T_{mANn}$ is omitted, because it is common to each phase in each degree n. As shown in the TABLE 1, in case that the degree n is 1 and 3, the torque in each phase is cancelled and a total torque becomes zero, if the positive phase (A, B) is deviated by 90° ($\pi/2$) from the negative phase ($\overline{A}$, $\overline{B}$), even though a small deviation angle $\epsilon$ exists between them.

However, in case that the degree n is 2, the torque in each phase is not cancelled and a cogging torque of the frequency $4\gamma_e$ is generated.

Accordingly, it is necessary to cancel the coefficient $T_{mANn}$ itself in case that the degree n is 2, in order to reduce further the cogging torque. In case of the three-phase motor, the coefficient can be expressed by Formulas 10 to 12.

$$T_{mUNn}=T_{mANn}\sin 2n\gamma_e \quad T_{mUSn}=T_{mANn}\sin 2n(\gamma_e+\epsilon) \quad (10)$$

$$T_{mVNn}=T_{mANn}\sin 2n(\gamma_e+2\pi/3) \quad T_{mVSn}=T_{mANn}\sin 2n(\gamma_e+2\pi/3+\epsilon) \quad (11)$$

$$T_{mWNn}=T_{mANn}\sin 2n(\gamma_e-2\pi/3) \quad T_{mWSn}=T_{mANn}\sin 2n(\gamma_e-2\pi/3-\epsilon) \quad (12)$$

The higher harmonic components of the three-phase motor cogging torque in each phase with respect to the low degrees n can be shown in a TABLE 2, as like as in the case of the two-phase motor.

TABLE 2

| | degree n | | | |
|---|---|---|---|---|
| | 1 | 2 | 3 | 4 |
| U phase | $\sin 2(\gamma_e)$ | $\sin 4(\gamma_e)$ | $\sin 6(\gamma_e)$ | $\sin 8(\gamma_e)$ |
| $\overline{U}$ phase | $\sin 2(\gamma_e + \epsilon)$ | $\sin 4(\gamma_e + \epsilon)$ | $\sin 6(\gamma_e + \epsilon)$ | $\sin 8(\gamma_e + \epsilon)$ |
| V phase | $\sin(2\gamma_e - 2\pi/3)$ | $\sin(4\gamma_e + 2\pi/3)$ | $\sin 6(\gamma_e)$ | $\sin(8\gamma_e - 2\pi/3)$ |
| $\overline{V}$ phase | $\sin(2(\gamma_e + \epsilon) - 2\pi/3)$ | $\sin(4(\gamma_e + \epsilon) + 2\pi/3)$ | $\sin 6(\gamma_e + \epsilon)$ | $\sin(8(\gamma_e + \epsilon) - 2\pi/3)$ |
| W phase | $\sin(2\gamma_e + 2\pi/3)$ | $\sin(4\gamma_e - 2\pi/3)$ | $\sin 6(\gamma_e)$ | $\sin(8\gamma_e + 2\pi/3)$ |
| $\overline{W}$ phase | $\sin(2(\gamma_e + \epsilon) + 2\pi/3)$ | $\sin(4(\gamma_e + \epsilon) - 2\pi/3)$ | $\sin 6(\gamma_e + \epsilon)$ | $\sin(8(\gamma_e + \epsilon) + 2\pi/3)$ |
| $\Sigma$ | $=0$ | $=0$ | $\approx 6\sin 6(\gamma_e)$ | $=0$ |

As shown in TABLE 2, in case that the degree n is 1 and 2, a total torque of the U, V, W phase components and $\overline{U}$, $\overline{V}$, $\overline{W}$ phase components becomes zero, because they have a phase difference of $2\pi/3$, respectively, and balanced to one another. Further, it is certified that the total torque becomes zero irrespective of the fact that a small deviation $\epsilon$, not 180° ($\pi$) exists between the U, V, W phase components and the $\overline{U}$, $\overline{V}$, $\overline{W}$ phase components. In case that the degree n is 3, a cogging torque is generated, because phase components are the same substantially with one another. Accordingly, it is necessary to cancel the coefficient $T_{mAN3}$ in case that the degree n is 3, in order to reduce further the cogging torque. As apparent from comparison of the TABLE 1 and the TABLE 2, the phase components exist in the two-phase motor when n is 2, whereas such phase components are not exist essentially in the three-phase motor, so that it can be said that the three-phase motor is superior to the two-phase motor in view of the cogging torque.

(Reduction of the Cogging Torque by Adjusting the Pole Teeth Arrangement)

As stated above, it is necessary to set the coefficient of the torque components in the two-phase motor when n is 2 or in the three-phase motor when n is 3 to zero, in order to reduce the cogging torque, such coefficient being expressed by the Formula 6. In order to set the coefficient to zero, there are two ways. One way is that the term $\sin n\alpha\pi$ in the right side of the Formula 6 is set to zero. The other way is that the $\Sigma$ portion in the right side of the Formula 6 is set to zero. In the former way, the spread range $\alpha$ of the magnetic pole must be reduced to $\alpha/n$. That is, a should be set to 0.5 in the two-phase motor and 0.33 in the three-phase motor, so that the magnetic flux passing through the winding is undesirably reduced remarkably. Accordingly, it is studied the latter way wherein the coefficient at the $\Sigma$ portion is set to zero. This means that the deviation angle $\beta_k$ of the claw pole in the S portion is adjusted. In this case, it must prevent the vibration and noise from being generated due to the unbalance of the large magnetic attraction force in the air gap of the motor. Accordingly, the distance of the claw poles must be adjusted while maintaining the symmetric property with respect to the axial center of the claw poles. If the distance of the claw poles is adjusted finery (vernier) to a small value, a large distant portion is formed inevitably. The magnetic attraction force at this portion becomes smaller than the magnetic attraction force of an opposite portion with respect to the center axis, so that the balance cannot be kept. This portion is subjected to the magnetic flux density varied according to the rotation of the rotor, so that the unbalanced relation of the magnetic attraction forces is varied and a vibration is generated. However, such vibration due to the unbalance of the magnetic attraction forces can be prevented from being generated, if the claw poles in each phase are divided into two or more groups and the magnetic attraction forces thereof are balanced to each other. In order to obtain a perfect balance, it is best to divide the claw poles into groups of a multiple number of two and to maintain the axial symmetric property. In case that the claw poles can not be divided into groups of a multiple number of two, the claw poles are divided into three or five groups, for example, so that the space vectors thereof are balanced and in each divided group, the total of the Formula 6 is set to zero. If the number of divided groups is d, it is enough to arrange the vectors of q or p/d uniformly in $2\pi$ (electric angle).

In this case, the deviation angle $\Delta\beta$ (electric angle) deviated from the reference angle $\beta_0$ between adjacent angles $\beta_k$ can be expressed by Formula 13.

$$\Delta\beta = \frac{2\pi}{2nq} = \frac{\pi}{nq} \qquad (13)$$

The reference angle $\beta_0$ is an angle of the claw pole of one side in case that the fine adjustment (vernier) is not carried out, and expressed as 360°/p in mechanical angle or $2\pi$ in electric angle. Accordingly, in case that $\Delta\beta$ is zero, the torques of the magnetic poles are the same in phase and not cancelled. However, in case that the $\Delta\beta$ in the Formula 13 is adopted, the torques are arranged equidistantly, so that the total sum thereof becomes zero. The concrete method thereof is explained below.

In the present invention, m sets of claw-pole type rotary machine are arranged coaxially with one another, and circumferentially shifted from one another by $2\pi/m$ in electric angle, where m is 4 and $\pi/2$ in two-phase. In case of the two-phase rotary machine, the two rotary machines are circumferentially shifted from each other by $\pi/2$ in electric angle.

Each of the rotary machine comprises a magnet rotor magnetized in a circumferential direction thereof so as to form N pole and S pole alternately, a claw-pole type stator arranged concentrically with the magnet rotor with an air gap therebetween, and an annular stator winding surrounded by claw poles of the stator. The claw poles of the stator are divided into a plurality of blocks and circumferentially and uniformly separated from one another, and a pitch (interval) of the claw poles of the same polarity in each block is shifted from a reference pitch $\beta_0$(360/p of mechanical angle) by a mechanical angle (1/p of electric angle) corresponding to an angle $\Delta\beta$ (electric angle), where $\Delta\beta$ is $\pi/nq$, n is a positive integer and 2 in case of a two-phase motor, or 3 in case of a three-phase motor, q is the number of the claw poles of the same polarity in each block and p/d, and p is the number of pole pairs or of claw poles at one side.

(In Case of Two-phase Motor)

Figure 4:
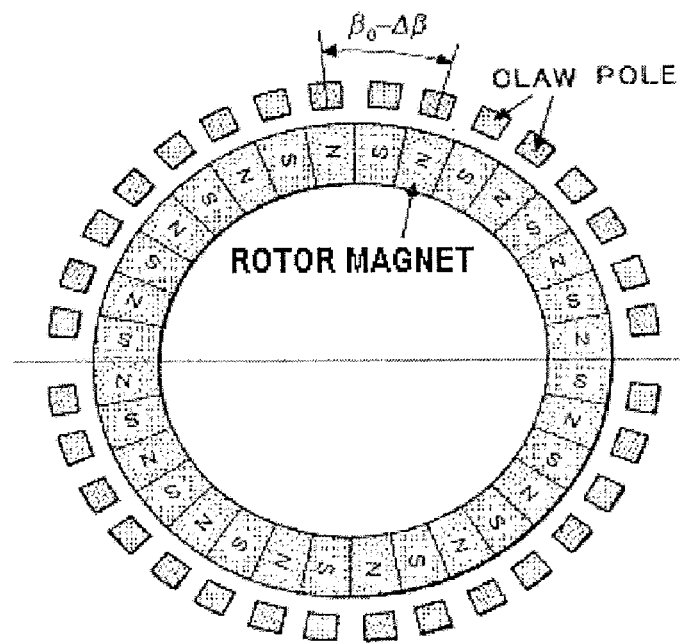
FIG. 4 is a view for explaining the relative position of the rotor magnetic poles and the stator claw poles of an embodiment of the motor shown in FIG. 1A.
Figure 5:
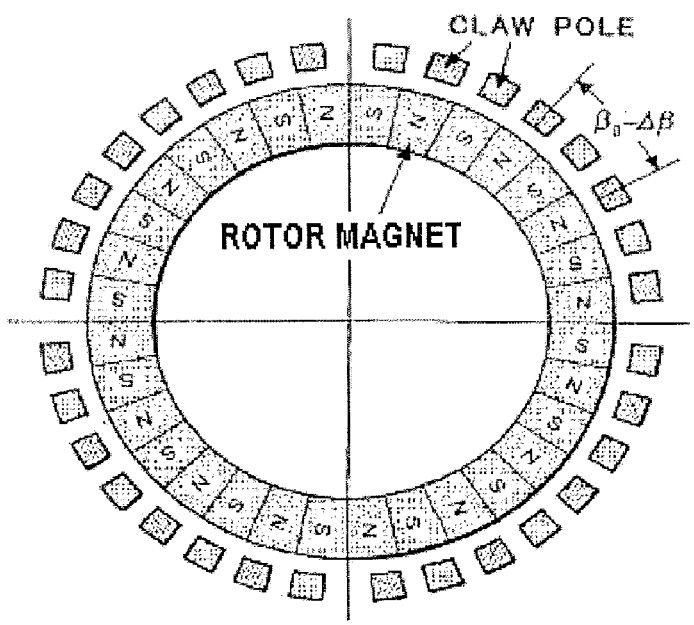
FIG. 5 is a view for explaining the relative position of the rotor magnetic poles and the stator claw poles of the other embodiment of the motor shown in FIG. 1A.

In case of the two-phase motor, n is 2. In case that the number of pole pairs is 16, and the magnetic poles are divided into two blocks, q is 8 and $\Delta\beta$ is 180/(2×8)=11.25° (electric angle) or 0.7° (mechanical angle). An actual interval of the claw poles becomes 21.8° (22.5°−0.7°). The arrangement of the claw poles is shown in FIG. 4. In case that the magnetic pole are divided into four blocks, q is 4 and $\Delta\beta$ is 180/(2×4)=22.5° (electric angle) or 1.4° (mechanical angle). An actual interval of the claw poles becomes 21.1° (22.5°−1.4°). This arrangement of the claw poles is shown in FIG. 5.

(In Case of Three-phase Motor)

Figure 6:
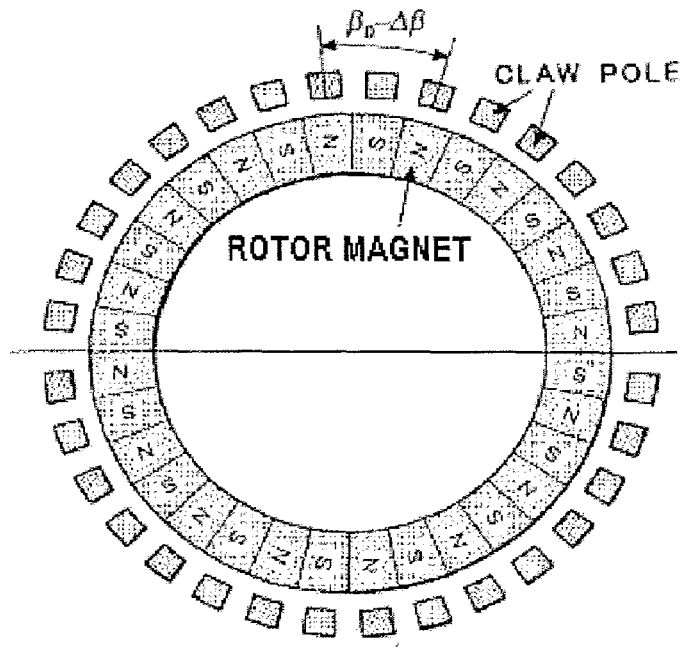
FIG. 6 is a view for explaining the relative position of the rotor magnetic poles and the stator claw poles of an embodiment of a three-phase motor.

In case of the three-phase motor, n is 3. In case that the number of pole pairs is 16, and the magnetic poles are divided into two blocks, q is 8 and $\Delta\beta$ is 180/(3×8)=7.5° (electric angle) or 0.47° (mechanical angle). An actual interval of the claw poles becomes 22.03° (22.5°−0.47°). This arrangement of the claw poles is shown in FIG. 6. In case that the magnetic poles are divided into four blocks, q is 4 and $\Delta\beta$ is 180/(3×4)=15° (electric angle) or 0.94° (mechanical angle). An actual interval of the claw poles becomes 21.56° (22.5°−0.94°). This arrangement of the claw poles is shown in FIG. 7.

The deviation $\epsilon$ with respect to the N pole side and the S pole side of the claw poles of two-phase motor or three-phase motor is not $\pi$ (electric angle), but is $\Delta\beta/2$ correctly, but there is no problem as shown in the TABLE 1 and the TABLE 2. In either case, the magnetic flux passing through the winding is not so reduced, because the deviation from the reference angle not finely adjusted is not so large, so that the cogging torque can be reduced remarkably. The pole pair number p can be set an arbitrary number instead of 16. The above motor is of inner rotor type. However, the above explanation can be applied similarly to the motor of outer rotor type.

(Inspection by the Three-Dimensional Finite Element Method Magnetic Field Analysis)

Figure 7:
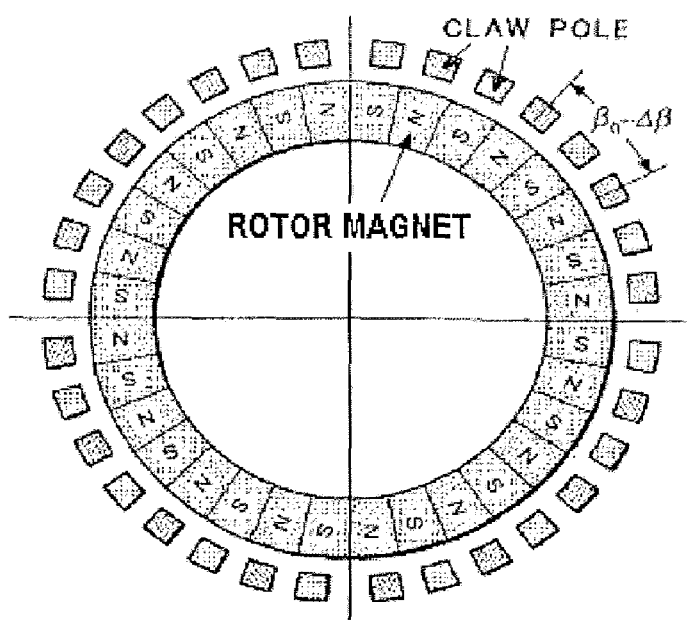
FIG. 7 is a view for explaining the relative position of the rotor magnetic poles and the stator claw poles of the other embodiment of the three-phase motor.
Figure 8:
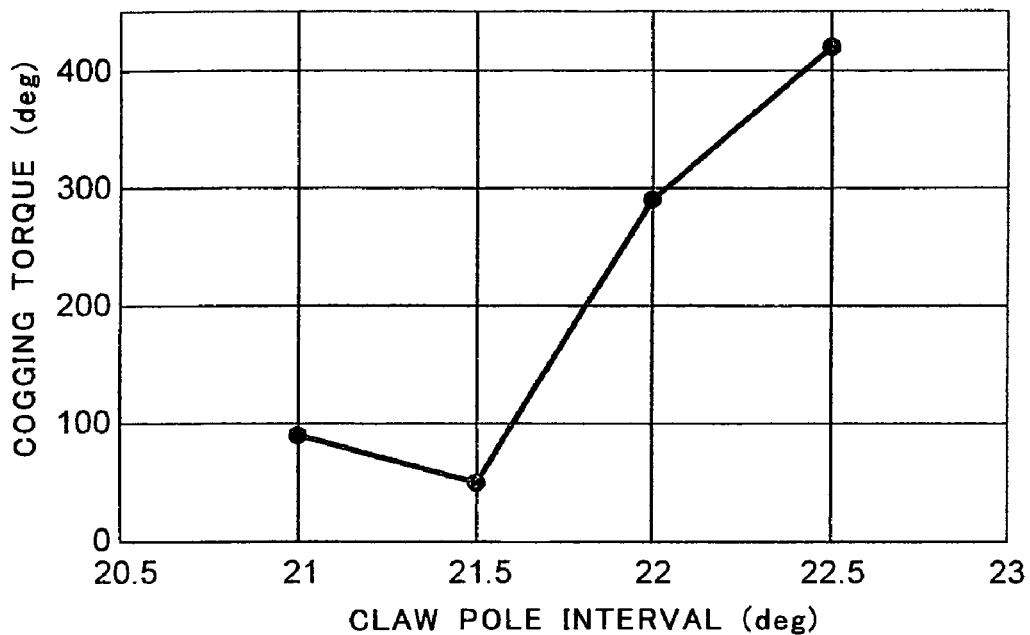
FIG. 8 is a graph explaining the relation between the interval of the claw poles and the cogging torque of the motor shown in FIG. 7.
Figure 9:
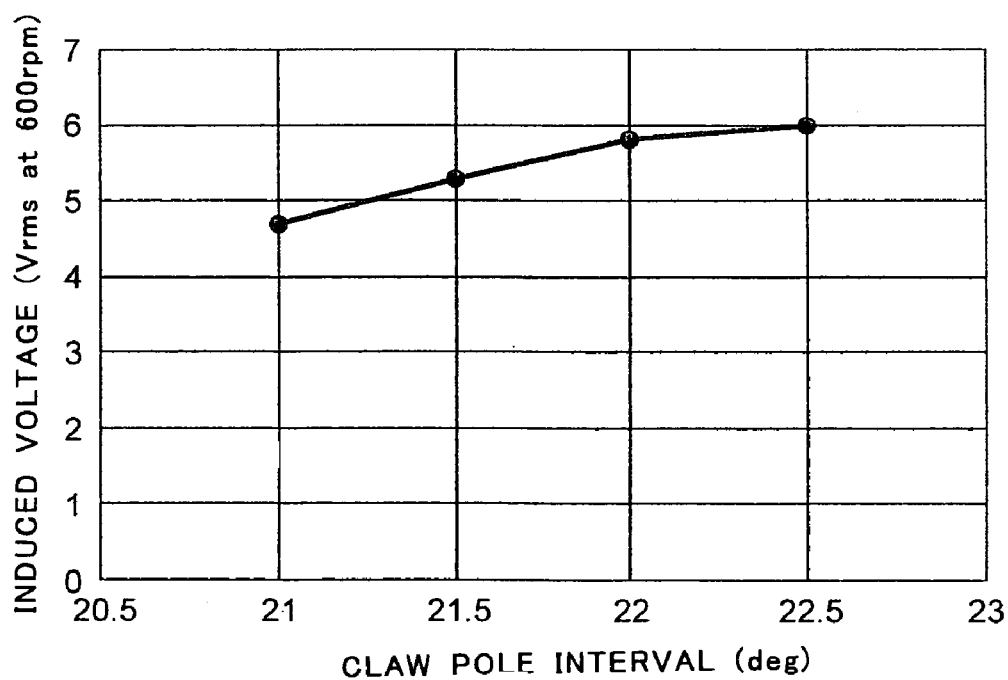
FIG. 9 is a graph explaining the relation between the interval of the claw poles and the induced voltage of the motor shown in FIG. 7.

An inspection was carried out for the motor having a typical structure as shown in FIG. 7 by using the three-dimensional finite element method. The interval of the claw poles was set to every 0.5° in relation to the mesh division of the finite element method. The result is shown in FIG. 8. As apparent from FIG. 8, the lowest value of the cogging torque exists at the claw pole interval of about 21.5°, which is reduced to about ⅛ times compared with the value of 22.5° when the vernier is not carried out. Further, the induced voltage is shown in FIG. 9. The induced voltage is reduced about 10% by the vernier (21.5°), but in the case that the claw-poles are divided into two blocks, the interval of the claw poles is 22°, so that the reduction of the induced voltage may be smaller than that and a large problem may not be generated. As shown in FIG. 8, the change of the cogging torque is large in a range larger than the angle of 21.5°, but the change of the cogging torque is small in a range smaller than that, so that the small reduction of the interval of the claw poles may be permitted though the induced voltage is reduced.

According to the multi-phase claw-pole type rotary machine of the present invention, no unbalance in the magnetic attraction force is generated because the axial symmetric property is maintained, so that the cogging torque is small and the large vibration and noise are not generated. The structure of the rotary machine is not special and is similar to the conventional motor, so that the manufacture thereof is easy and has no problems.

While the invention has been particularly shown and described with reference to the preferred embodiments thereof, it will be understood by those skilled in the art that various changes in form and details may be made therein without departing from the spirit and scope of the invention as defined by the appended claims.

We claim:

1. A two-phase claw-pole type rotary machine comprising:

first and second rotary machine elements each for single phase arranged coaxially with each other, each of the rotary machine elements having a magnet rotor magnetized in a circumferential direction thereof so as to form a N pole and a S pole, a claw-pole type stator arranged concentrically with the magnet rotor with an air gap therebetween, and an annular stator winding, wherein claw poles of the stator are divided into a plurality of blocks and are circumferentially separated from one another, wherein a distance between adjacent claw poles of the same polarity in each block is set to a value ($\beta_0-\Delta\beta$), substantially, where $\beta_0$ is a reference pitch when the claw poles of the same polarity are arranged equidistantly apart from one another in a range of 360°, $\Delta\beta$ is $\pi/2q$, and q is a number of claw poles of the same polarity in each block, and wherein the first and second rotary machine elements are circumferentially shifted from each other by 90° (electric angle).

2. A two-phase claw-pole type rotary machine as claimed in claim 1, wherein the claw poles of the stator are divided into two blocks and are circumferentially separated from each other.

3. A two phase claw-pole type rotary machine as claimed in claim 1, wherein the claw poles of each stator are divided into four blocks and are circumferentially separated from one another.

4. A three-phase claw-pole type rotary machine comprising:
first, second and third rotary machine elements each for single phase arranged coaxially with one another, each of the rotary machine elements having a magnet rotor magnetized in a circumferential direction thereof so as to form a N pole and a S pole, a claw-pole type stator arranged concentrically with the magnet rotor with an air gap therebetween, and an annular stator winding, wherein claw poles of each stator are divided into a plurality of blocks and are circumferentially separated from one another, a distance between adjacent claw poles of the same polarity in each block is set to a value of $(\beta_0 - \Delta\beta)$, substantially,
where $\beta_0$ is a reference pitch when the claw poles of the same polarity are arranged equidistantly apart from one another in a range of 360°, $\Delta\beta$ is $\pi/3q$, and q is a number of claw poles of the same polarity in each block, and wherein the first, second and third rotary machine elements are circumferentially shifted from one another by 120° (electric angle).

5. A three-phase claw-pole type rotary machine as claimed in claim 4, wherein the claw poles of the stator are divided into two blocks and are circumferentially separated from each other.

6. A three-phase claw-pole type rotary machine as claimed in claim 4, wherein the claw poles of each stator being divided into four blocks and are circumferentially separated from one another.

7. A two-phase claw-pole type rotary machine comprising:
a first rotary machine element which defines a first phase and which includes
a first rotor which is circumferentially magnetized by alternating N and S poles,
a first claw-pole stator which has a plurality of claw poles and concentrically surrounds the first rotor with an air gap therebetween, and
a first stator winding connected to the first stator;
a second rotary machine element which defines a second phase and which includes
a second rotor which is circumferentially magnetized by alternating N and S poles,
a second claw-pole stator which has a plurality of claw poles and concentrically surrounds the second rotor with an air gap therebetween, and
a second stator winding connected to the second stator;
the claw poles of each of the first and second claw pole stators being divided into blocks which are circumferentially separated from one another, and the adjacent claw poles of the same polarity being separated by a distance which is defined by the value of $(\beta_0 - \Delta\beta)$; wherein
$\beta_0$ is the magnitude of a reference pitch defined when claw poles of the same polarity are arranged equidistantly apart from one another within a 360° range,
$\Delta\beta$ is $\pi/2q$, in which q is a number of claw poles of the same polarity in each block, and wherein
the first and second rotary machine elements are circumferentially shifted from each other by an electric angle of 90°.

8. The two-phase claw-pole type rotary machine as claimed in claim 7, wherein the claw poles are divided into two blocks which are circumferentially separated from each other.

9. A two-phase claw-pole type rotary machine as claimed in claim 7, wherein the claw poles are divided into four blocks which are circumferentially separated from one another.

10. A three-phase claw-pole type rotary machine comprising:
a first rotary machine element which defines a first phase and which includes
a first rotor which is circumferentially magnetized by alternating N and S poles,
a first claw-pole stator which has a plurality of claw poles and concentrically surrounds the first rotor with an air gap therebetween, and
a first stator winding connected to the first stator;
a second rotary machine element which defines a second phase and which includes
a second rotor which is circumferentially magnetized by alternating N and S poles,
a second claw-pole stator which has a plurality of claw poles and concentrically surrounds the second rotor with an air gap therebetween, and
a second stator winding connected to the second stator;
a third rotary machine element which defines a third phase and includes
a third rotor which is circumferentially magnetized by alternating N and S poles,
a third claw-pole stator which has a plurality of claw poles and concentrically surrounds the third rotor with an air gap therebetween, and
a third stator winding connected to the third stator;
the claw poles of each of the first, second, and third claw pole stators being divided into blocks which are circumferentially separated from one another, and the adjacent claw poles of the same polarity being separated by a distance which is defined by the value of $(\beta_0 - \Delta\beta)$; wherein
$\beta_0$ is the magnitude of a reference pitch defined when claw poles of the same polarity are arranged equidistantly apart from one another within 36° range,
$\Delta\beta$ is $\pi/3q$ in which q is a number of claw poles of the same polarity in each block, and wherein
the first, second, and third rotary machine elements are circumferentially shifted from each other by an electric angle of 120°.

11. A three-phase claw-pole type rotary machine as claimed in claim 10, wherein the claw poles are divided into two blocks which are circumferentially separated from each other.

12. A three-phase claw-pole type rotary machine as claimed in claim 10, wherein the claw poles of each stator being divided into four blocks which are circumferentially separated from one another.

* * * * *